United States Patent [19]

Kawabata

[11] Patent Number: 5,194,483
[45] Date of Patent: Mar. 16, 1993

[54] WATER-BASED PROTECTIVE COMPOSITIONS FOR COATING FILMS AND PREPARATION PROCESSES THEREOF

[75] Inventor: Nobuaki Kawabata, Yokohama, Japan

[73] Assignee: Nippon Oil Co., Ltd., Tokyo, Japan

[21] Appl. No.: 794,972

[22] Filed: Nov. 20, 1991

Related U.S. Application Data

[62] Division of Ser. No. 533,398, Jun. 5, 1990, Pat. No. 5,098,948.

[30] Foreign Application Priority Data

Jun. 6, 1989 [JP] Japan .................................. 1-42059

[51] Int. Cl.$^5$ .............................................. C09D 5/00
[52] U.S. Cl. .................................. 524/462; 524/522; 524/558; 524/560
[58] Field of Search ............... 524/462, 522, 556, 560

[56] References Cited

U.S. PATENT DOCUMENTS 4,571,415  2/1986  Jordan .................................. 524/395

FOREIGN PATENT DOCUMENTS 370339    5/1990  European Pat. Off. .
70018W    9/1975  Japan .
1322768   7/1973  United Kingdom .

*Primary Examiner*—Joseph L. Schofer
*Assistant Examiner*—Jeffrey T. Smith
*Attorney, Agent, or Firm*—Cushman, Darby & Cushman

[57] ABSTRACT

Disclosed herein are water-based protective composition for coating films. The compositions contain (a) a water-based dispersion of copolymer particles having a number average molecular weight of from 2,000 to 20,000 and a glass transition point of from $-10°$ C. to $+40°$ C. and obtained by emulsion-polymerizing 100 parts by weight of a monomer mixture consisting substantially of (X) 7-12 parts by weight of an $\alpha,\beta$-monoethylenically-unsaturated carboxylic acid and (Y) 88-93 parts by weight of at least one ester selected from the group consisting of $C_{1-4}$-alkyl acrylates and $C_{1-4}$-alkyl methacrylates; as well as specific amounts of (b) an ultraviolet absorber, (c) an antioxidant, (d) a thickening agent and (e) a surface active agent. They can form barrier coats having excellent removability, weatherability, water-proofness, heat resistance and coating-film-protecting property. Their preparation processes are also disclosed.

9 Claims, No Drawings

WATER-BASED PROTECTIVE COMPOSITIONS FOR COATING FILMS AND PREPARATION PROCESSES THEREOF

This is a division of application Ser. No. 07/533,398, filed Jun. 5, 1990 now U.S. Pat. No. 5,098,948.

BACKGROUND OF THE INVENTION

1. Field of the Invention

The present invention relates to water-based protective compositions for coating films and preparation processes thereof. Specifically, the present invention is concerned with water-based protective compositions which can be applied onto painted or otherwise coated surfaces of motor vehicles, agricultural machines, construction machines and other machines and equipment for their temporary protection and also with preparation processes thereof.

2. Description of the Prior Art

Large commodities such as motor vehicles are prone to fouling, staining, smear or the like at painted or otherwise coated surfaces by wind and rain, moisture, sunlight, air, iron powder, bird droppings, pollutants in the air such as soot, etc. during the periods until they are delivered to end consumers. To prevent such fouling and maintain their commercial values, it has been the conventional practice to additionally apply a coating-film-protecting agent over coated surfaces of a motor vehicle or the like and to remove the protecting agent shortly before its delivery to a consumer.

The coating-film-protecting agent mentioned above is, as is apparent from its application purpose, required to have durability high enough not to be removed easily by wind, rain, moisture and the like and also to have easy removability permitting easy stripping-off with an organic solvent or water or by hand-wiping whenever its removal is needed.

Conventional coating-film-protecting agents include, for example, wax-solvent dispersions (e.g., Japanese Patent Laid-Open No. 28534/1975), strippable barrier coats (removable when they become no longer needed; for example, Japanese Patent Publication No. 7303/1979), wax-solid powder-solvent dispersions (hand-wiping is feasible; for example, Japanese Patent Laid-Open No. 149188/1976 or 62978/1980), and water-based emulsions (a wax is emulsified and dispersed; for example, Japanese Patent Publication No. 34030/1970). Among these coating-film-protecting agents, drawbacks of those accompanied by evaporation of an organic solvent upon coating and drying and those requiring an organic solvent upon removal, especially, pollution problems, wasting of natural resources, economy and safety are highlighted in recent years.

Interests have hence been concentrated on coating-film-protecting agents of the acrylic polymer emulsion type having the advantages that they are free of evaporation of organic solvent and can be easily removed with alkaline water (Japanese Patent Publication No. 50517/1980, Japanese Patent Laid-Open No. 253673/1987, etc.). These coating-film-protecting agents are also excellent from the standpoint of protective action for the prevention of rusting and damages of metal surfaces.

However, the above-mentioned coating-film-protecting agents of the acrylic polymer emulsion type are not considered to be fully satisfactory in overall properties. Their protecting effects were sometimes insufficient, for example, when a plasticizer or a surface active agent contained in acrylic resins attacked coated surfaces which were supposed to be protected or when the barrier-coated surfaces were exposed to sunlight (ultraviolet rays) under the blazing sun in summer. There has accordingly been a desire for the development of a water-based coating-film-protecting agent which is sufficient in various properties required for coating-film-protecting agents while retaining the excellent performance of coating-film-protecting agents of the acrylic polymer emulsion type.

SUMMARY OF THE INVENTION

An object of the present invention is therefore to provide a water-based protective composition for coating films, which can form a barrier coat easily removable with alkaline water and having excellent weatherability, waterproofness, heat resistance, coating-film-protecting property and removability, and also a preparation process thereof.

The above object can be achieved by the provision of a water-based protective composition for coating films, comprising:

(a) a water-based dispersion of copolymer particles having a number average molecular weight of from 2,000 to 20,000 and a glass transition point of from $-10°$ C. to $+40°$ C. and obtained by emulsion-polymerizing 100 parts by weight of a monomer mixture consisting substantially of (X) 7–12 parts by weight of an $\alpha,\beta$-monoethylenically-unsaturated carboxylic acid and (Y) 88–93 parts by weight of at least one ester selected from the group consisting of $C_{1-4}$-alkyl acrylates and $C_{1-4}$-alkyl methacrylates;

(b) 0.1–5 parts by weight of an ultraviolet absorber, per 100 parts by weight of the monomer mixture employed for the preparation of the water-based dispersion (a);

(c) 0.1–5 parts by weight of an antioxidant, per 100 parts by weight of the monomer mixture employed for the preparation of the water-based dispersion (a);

(d) 0.1–2 parts by weight of at least one compound selected from the group consisting of acrylic thickening agents and natural gums, per 100 parts by weight of the total amount of the water-based dispersion (a); and (e) 0.01–6 parts by weight of at least one surface active agent selected from fluorocarbon-type surface active agents and acetylenic nonionic surface active agents, per 100 parts by weight of the total amount of the water-based dispersion (a), and by a process for the preparation of the composition, which comprises subjecting a mixture of the above components (a)–(e) to high-pressure homogenization treatment.

In the water-based composition according to the present invention, the individual components exhibit synergistic effects. The water-based composition therefore has the following merits:

(1) It can form barrier coats having excellent weatherability even under severe environmental conditions.

(2) The barrier coats also have excellent waterproofness, heat resistance and dryability.

(3) The barrier coats also have superb protective properties for coating films.

(4) The barrier coats can be removed easily with an aqueous alkaline solution.

Coating-film-protecting water-based compositions of the present invention are water-based compositions free of organic solvent. They therefore have the merits of the conventional coating-film-protecting agents of the acrylic polymer emulsion type such that they are free of the potential dangers of pollution and accidents, can avoid wasting of natural resources and are economical. From the overall viewpoints including the above properties (1)-(4), the coating-film-protecting water-base compositions of the present invention are extremely useful from the practical viewpoint.

DESCRIPTION OF THE PREFERRED EMBODIMENTS

The water-based dispersion as the component (a) has been obtained by subjecting at least the monomer (X) and the monomer (Y) to emulsion copolymerization. The term "water-based dispersion" as used herein means a dispersion of the type that particles of the emulsion copolymer are dispersed in water.

Illustrative of the $\alpha,\beta$-monoethylenically-unsaturated carboxylic acid (X) include acrylic acid, methacrylic acid, crotonic acid, itaconic acid, maleic acid, fumaric acid, citraconic acid, mesaconic acid, and mixtures thereof.

Exemplary esters (Y) include methyl acrylate, ethyl acrylate, n-propyl acrylate, iso-propyl acrylate, n-butyl acrylate, iso-butyl acrylate, sec-butyl acrylate, tert-butyl acrylate, methyl methacrylate, ethyl methacrylate, n-propyl methacrylate, iso-propyl methacrylate, n-butyl methacrylate, iso-butyl methacrylate, sec-butyl methacrylate, tert-butyl methacrylate, and mixtures thereof.

Where the total amount of the monomer mixture employed in the emulsion polymerization for obtaining the component (a) is 100 parts by weight, the amount of the $\alpha,\beta$-monoethylenically-unsaturated carboxylic acid is 7-12 parts by weight, preferably 8-10 parts by weight. On the other hand, the amount of the ester (Y) is 88-93 parts by weight, preferably 90-92 parts by weight. If the amounts of the $\alpha,\beta$-monoethylenically-unsaturated carboxylic acid and the ester (Y) are less than 7 parts by weight and more than 93 parts by weight, respectively, the resulting composition cannot form barrier coats which have good alkaline water removability. On the other hand, if the amount of the $\alpha,\beta$-monoethylenically-unsaturated carboxylic acid (X) exceeds 12 parts by weight and that of the ester (Y) is less than 88 parts by weight, the resulting composition can only form barrier coats having poor alkaline water removability, weatherability and dryability.

No particular limitation is imposed on the manner of the emulsion polymerization for obtaining the component (a) as long as the desired water-based dispersion with the desired copolymer particles dispersed in water is obtained. The monomer mixture can be polymerized by a known emulsion polymerization process.

It is desirable to use a polymerization initiator and an emulsifier in the emulsion polymerization. Exemplary polymerization initiators include persulfates such as ammonium persulfate and potassium persulfates; inorganic peroxides such as hydrogen peroxide; organic peroxides such as benzoyl peroxide, cumene hydroperoxide and di-tert-butyl peroxide; and azobisisobutyronitrile. The polymerization initiator can be used desirably in an amount of 0.1-2 parts by weight per 100 parts by weight of the monomer mixture. Illustrative of the emulsifier include anionic emulsifiers such as sodium laurylsulfate; and nonionic emulsifiers such as polyoxyethylene nonylphenyl ether and polyoxyethylene oleyl ether. Two or more emulsifiers can be used in combination.

The emulsion polymerization generally proceeds around 40° C.-80° C. In this case, the reaction time is suitably 1-8 hours. The amount of water upon emulsion polymerization, namely, the amount of the water in the water-based dispersion (a) is preferably 1.5-10 times by weight the total amount of the monomer mixture.

The number average molecular weight of the copolymer particles obtained by the emulsion polymerization is 2,000-20,000, preferably 4,000-14,000. Number average molecular weights smaller than 2,000 result in poor dryability, whereby sticky barrier coats are formed. Number average molecular weights greater than 20,000 lead to the formation of barrier coats which are too hard to exhibit good alkaline water removability. The glass transition point of the copolymer particles is from −10° C. to +40° C., with from 0° C. to +20° C. being preferred. When the glass transition point is lower than −10° C., the resulting composition can only form barrier coats which are soft and are hence prone to deposit of earth, sand and the like. Glass transition points higher than 40° C. result in the formation of compositions having poor film-forming property.

No particular limitation is imposed on the average particle size of the copolymer particles in the water-based dispersion as long as the particle size allows the copolymer particles to function as a coating-film-protecting agent. The average particle size can desirably be about 0.1-5.0 μm, with about 0.3-1.0 μm being preferred.

Examples of the ultraviolet absorber as the component (b) include salicylate esters such as methyl salicylate, phenyl salicylate, cresyl salicylate and benzyl salicylate; benzophenones such as 2-hydroxybenzophenone, 2-hydroxy-4-benzyloxybenzophenone, 2-hydroxy-4-octoxybenzophenone, 2-hydroxy-5-chlorobenzophenone and 2-aminobenzophenone; benzotriazoles such as 2-(2'-hydroxy-5'-t-butylphenyl)benzotriazole, 2-(2'-hydroxy-5'-t-butylphenyl)-5-chrolobenzotriazole, 2-(2'-hydroxy-5'-methoxyphenyl)-benzotriazole and 2-(2'-hydroxy-3',5'-di-neopentylphenyl)benzotriazole; substituted acrylonitriles such as ethyl 2-cyano-3,3-diphenylacrylate, 2-ethylhexyl 2-cyano-3,3-diphenylacrylate and methyl $\alpha$-cyano-$\beta$-methyl-4-methoxycinnamate; 2,2'-thiobis(4-octylphenolate)-nickel complex; 2,2'-thiobis(4-t-octylphenolate)-n-butylamine-nickel complex; and mixtures thereof.

The ultraviolet absorber (b) is incorporated in an amount of 0.1-5 parts by weight, preferably 0.5-2 parts by weight per 100 parts by weight of the monomer mixture employed for the preparation of the component (a). Amounts of the ultraviolet absorber (b) smaller than 0.1 part by weight are too little to exhibit sufficient effects for the prevention of deterioration by ultraviolet rays. Amounts greater than 5 parts by weight cannot bring about additional effects and moreover, make it difficult to disperse the ultraviolet absorber in the resulting water-based dispersions and result in the occurrence of precipitation.

The antioxidant as the component (c) desirably has a melting point of 50°-160° C. Exemplary antioxidants include monophenolic antioxidants such as 2,6-di-t-butyl-p-cresol, butylated hydroxyanisole and 2,6-di-t-butyl-4-ethylphenol; bisphenolic antioxidants such as 2,2'-methylene-bis(4-methyl-6-t-butylphenyl), 2,2'-methylenebis(4-ethyl-6-t-butylphenol) and 4,4-methylenebis(2,6-di-t-butylphenol); high-molecular phenolic antioxidants such as tetrakis-[methylene- (3,3′,5′-tri-t-butyl-4′-hydroxyphenyl) propionate]methane and 1,3,5-trimethyl-2,4,6-tris(3,5-di-t-butyl-4-hydroxybenzyl)benzene; sulfur-containing antioxidants such as distearyl thiopropionate; and mixtures thereof. If compositions are used under very severe conditions, e.g., under the blazing sun in summer, an antioxidant having a melting point of 120°–160° C., for example, 4,4′-methylenebis-(2,6-di-t-butylphenol) is preferably used in view of evaporation.

The antioxidant (c) is incorporated in an amount of 0.1–5 parts by weight, preferably 0.3–2 parts by weight per 100 parts by weight of the amount of the monomer mixture employed for the preparation of the component (a). Amounts smaller than 0.1 part by weight are too little to exhibit oxidation-preventing effects, while amounts greater than 5 parts by weight induce fouling of coating films.

The component (d) is at least one compound selected from the group consisting of acrylic thickening agents and natural gums. Exemplary acrylic thickening agents include polyacrylic acids and alkali-neutralized products of polyacrylic acids. These alkali-neutralized products include the ammonium salts, alkali metal salts, amine salts and morpholine salts. Particularly preferred are alkalineutralized products of purified polyacrylic acids from which impurities and unreacted acrylic acid have been eliminated. From the standpoint of storage stability, the ammonium salts of polyacrylates are preferred. Exemplary natural gums include xanthane gum, guar gum and locust beam gum. Xanthane gum is preferred from the standpoint of handling. As the component (d), two or more of such acrylic thickening agents and/or natural gums can be used in combination.

Regarding the amount of the component (d), it is necessary to incorporate the component (d) in an amount of 0.1–2 parts by weight based on the total amount (100 parts by weight) of the dispersed particles, water, etc. in the water-based dispersion as the component (a). Preferable amount is 0.3–1.0 part by weight. Amounts smaller than 0.1 part by weight hardly exhibit thickening effects. On the other hand, amounts greater than 2 parts by weight result in the formation of barrier coats of reduced waterproofness prone to easy separation, or lead to an abrupt viscosity increase so that the resulting compositions have poor coatability.

Incidentally, thickening agents other than those mentioned above as examples of the component (d) have also been known conventionally, including celluloses such as ethylhydroxycellulose, methylcellulose and carboxymethylcellulose; polyvinyl alcohol; sodium alginate; water-containing sodium silicate; organic bentonite clay; etc. Use of one or more of these thickening agents instead of the component (d) however results in the separation into two layers, settling and separation, fouling of coating films, the formation of barrier coats liable to peeling due to reduced waterproofness, or the like.

The component (e) is at least one compound selected from the group consisting of fluorocarbon-type surface active agents and acetylenic nonionic surface active agents. They act as so-called "wetting agent". Exemplary fluorocarbon-type surface active agents include hydrophilic-group-containing oligomers having perfluoroalkyl-containing groups and hydrophobic-group-containing oligomers having perfluoroalkyl groups; and lower fatty acid salts of perfluoroalkylsulfonamides, ethylene oxide adducts, and alkyl betaine adducts. Among these, one or more of alkylbetaine adducts and lower fatty acid salts of pefluoroalkylsulfonamides can be employed preferably. Exemplary acetylenic nonionic surface active agents include volatile acetylenic alcohols, non-volatile acetylenic glycols and ethylene oxide adducts thereof. Among these, volatile acetylenic alcohols can be used preferably as they do not remain in dried barrier coats. Two or more of the above-described various surface active agents can be used in combination.

As to the amount of the component (e), it is necessary to add it in an amount of 0.01–6 parts by weight based on the total amount (100 parts by weight) of the dispersed particles, water, etc. in the water-based dispersion as the component (a). Preferable amount is 0.05–3 parts by weight. Amounts smaller than 0.01 part by weight result in the development of repellency to coating films, whereby the wetting property is not improved and uniform barrier coats cannot be formed. On the other hand, amounts greater than 6 parts by weight lead to water-based dispersions which tend to undergo substantial foaming and when coated, can give only barrier coats of reduced waterproofness.

Incidentally, wetting agents other than those mentioned above as examples of the component (e) have also been known conventionally, including sodium laurylsulfate, sodium dialkylsulfonesuccinates, sodium dodecylbenzenesulfonate, lecithin, sodium pyrophosphate, etc. Use of one or more of these wetting agents in place of the component (e) however results in the formation of barrier coats of reduced waterproofness, whereby the barrier coats develop the peeling problem.

The water-based protective composition of the present invention, which is suited for coating films, can be prepared preferably by adding the individual components (b)–(e) to the water-based dispersion as the component (a) and then subjecting the resultant mixture to high-pressure homogenization treatment. The high-pressure homogenization treatment can be easily performed, for example, by using a high-pressure homogenizer. Namely, the high-pressure homogenization treatment comprises causing the mixture, which is to be treated, to successively flow under a high pressure which is preferably at least 100 kgf/cm$^2$, more preferably at least 150 kgf/cm$^2$, desirably at least 300 kgf/cm$^2$. During the treatment, the temperature is desirably at least 90° C. Mere stirring under normal pressure without high-pressure homogenization treatment induces phase separation and settling separation on the resulting composition.

In addition to the essential components (a)–(e) described above, the water-based protective composition of the present invention which is suited for coating films can also be added, for example, with one or more of organic solvents such as film-forming aids, various water-soluble resins, defoaming agents, antifreezing agents and the like as needed. It is desirable to add these optional components before the high-pressure homogenization treatment. When one or more of such optional components are used, their total amount can be desirably 0.1–5 parts by weight, preferably 0.5–2 parts by weight per 100 parts by weight of the monomer mixture employed for the preparation of the component (a).

Example 1

In a stainless steel reactor, 85 g of water and 1 g of sodium laurylsulfate were charge and heated to 70° C. While the contents were stirred under a nitrogen gas stream, 0.2 g of ammonium persulfate was added, followed by the dropwise addition of 10 g of methyl methacrylate, 3.5 g of ethyl methacrylate and 1.5 g of methacrylic acid. They were copolymerized for about 4 hours. The reaction mixture was retained at 70° C. for further 1 hour to complete the polymerization, whereby a water-based dispersion was obtained as the component (a).

Added to 100 g of the water-based dispersion was 0.5 ml of aqueous ammonia, followed by the addition of 2 g of an acrylic thickening agent (40% concentration) as the component (d) and 1000 wt. ppm of a fluorocarbon-type surface active agent as the component (e). The resultant mixture was added further with a solution which had been prepared in advance by dissolving at 75° C. 0.1 g of a benzotriazole-type ultraviolet absorber as the component (b) and 0.1 g of bisphenolic antioxidant as the component (c) in 3 g of toluene, followed by stirring into a uniform mixture.

Using a high-pressure homogenizer manufactured by Gaulin Corp., the mixture was subjected to high-pressure homogenization treatment at 93° C. and 300 kgf/cm$^2$. The water-based composition thus obtained was excellent in the stability of dispersion of the fine particles of the acrylic copolymer. It had the following properties.

| Contents of non-volatiles: | 15 wt. % |
|---|---|
| Viscosity: | 70 cp |
| pH: | 7.6 |

Minimum film-forming temperature: about 10° C.

Examples 2-5 and Comparative Examples 1-6

Water-based compositions were obtained in a similar manner to Example 1 except that the individual components were used in the proportions given in Table 1.

The number average molecular weight and the glass transition point of the particles are shown in Table 1. And the performance evaluation shown in Table 1 were conducted in the following manner.

Preparation of test pieces

Coated plates which had been obtained by baking a black aminoalkyd resin on mild steel plates of 150 mm×70 mm (1 mm thick) were sprayed and coated with the water-based compositions of Examples 1-5 and Comparative Examples 1-6, respectively by an air spray gun. They were then left over at room temperature for 24 hours to form wax barrier coats of 15 μm thick on average (as calculated on the basis of their weights), whereby test pieces were prepared.

(1) Appearance of protective barrier coats

The protective barrier coats were observed from the standpoints of transparency, smoothness, thickness, uniformity and the like.

(2) Heat resistance test

Each test piece was held upright in a constant-temperature chamber and was left over at 80° C. for 96 hours. The barrier coat was observed for run-away, cracking and other changes. The barrier coat was then washed with detergent-containing warm water and then wiped with gauze. The alkyd coating was observed for delustering, blister and other changes. The observation results are expressed by the following four-stage ranking system:
 A: Absolutely no changes were observed on the coated surface.
 B: No changes were observed on the coated surface.
 C: Slight changes were observed.
 D: Some changes were observed.

(3) Accelerated weatherability test

Coating film test

Each test piece was placed in a sunshine weatherometer and was tested at 63° C. for 250 hours while cold water was sprayed for 18 minutes at intervals of 2 hours. After the wax barrier coat was removed, the coated surface (coating film) was observed for stains, spots, delustering and other changes. The observation results are expressed by the following four-stage ranking system:
 A: No changes were observed.
 B: Extremely small changes were observed.
 C: Some changes were observed.
 D: Substantial changes were observed.

Removability test

Each test piece was immersed for 3 minutes in a 1.0 wt. % aqueous solution of sodium metasilicate. The removability was expressed by the following four-stage ranking system:
 A: Complete removal of the barrier coat was feasible.
 B: Substantial removal of the barrier coat was feasible.
 C: About 50% removal of the barrier coat was feasible.
 D: Removal of the barrier coat was almost impossible.

(4) Protection test

Iron powder test

On each test piece, 0.5 g of iron powder of about 200 mesh was spread evenly. After the test piece was heated at 80° C. for 5 hours, the test piece was subjected to salt spray test. 24 hours later, the acrylic barrier coat was removed and the coated surface was investigated to determine occurrence of rusting. The results were expressed by the following 4-stage ranking system:
 A: Absolutely no rusting.
 B: No rusting.
 C: Some rusting.
 D: Substantial rusting.

Soot resistance test

On each test piece, 0.5 g of soot of pH 2, whose sulfuric acid concentration was 0.5%, was placed in the form of a ball. The test piece was maintained at 70° C. for 2 hours in a constant-temperature chamber. After the test, the wax barrier coat was removed with a 1.0 wt. % aqueous solution of sodium metasilicate. After the test piece was dried in the air, the coating surface was observed. The results were evaluated by the following 3-stage ranking system:
 A: No spot-like discoloration was observed.
 B: Some discoloration was observed.
 C: Distinct spot-like discoloration was observed.

Sulfuric acid resistance test

On the barrier coat of each test piece, 0.1 ml of 6% sulfuric acid was placed in the form of a droplet. The test piece was left over at room temperature for 24 hours. After the test, the barrier coat was washed off with detergent-containing warm water and then dried in the air. The test piece was observed for the degrees of discoloration and corrosion at the location where sulfuric acid was placed. The results were evaluated by the following three-stage ranking system:
 A: No spot-like discoloration was observed.
 B: Some spot-like discoloration was observed.
 C: Distinct spot-like discoloration was observed.

(5) Outdoor weatherability test

Barrier coat test

After each test piece was exposed to sunlight for 3 months in summer, the barrier coat was observed for changes. The results are expressed by the following four-stage ranking system:

A: No changes were observed.
B: Extremely small changes were observed.
C: Some changes were observed.
D: Substantial changes were observed.

Coating film test

Each test piece was immersed in a 1.0 wt. % aqueous solution of sodium metasilicate to remove its barrier coat. The coated surface (coating film) was observed for stains, spots, delustering and other changes. The evaluation of the results was conducted in a similar manner to the coating film test at (3).

Removability test

Automobile doors (black) were coated with the emulsions of the examples and comparative examples, respectively by using an air spray gun. After the doors were exposed to sunlight for 3 months in summer, they were immersed for 3 minutes in a 0.4 wt. % aqueous solution of sodium metasilicate and their barrier coats were removed with warm water of 60° C. by a car washer. The readiness of removal was expressed by the following four-stage ranking system.

A: Easily removable.
B: Substantially removable.
C: A little difficult to remove.
D: Unremovable.

(6) Dryability test

Similarly to the coating film test under (5), each wax emulsion was coated on one of the black coated plates. The plate was immediately placed in a constant-temperature chamber which was controlled at 50° C. and an air velocity of 3 m/sec, whereby the plate was dried. The plate was then sprayed for 5 minutes with water from a shower which was connected to a faucet of a sink. The drying time required to render the barrier film free from blister and separation was recorded as its rain-resistant drying time. The results were expressed by the following ranking system:

A: Dried in 1 minute.
B: Dried in 1-2 minutes.
C: More than 2 minutes were required for drying.

(7) Emulsion stability test

Each water-based composition was left over for 1 month at room temperature to determine variations in viscosity, appearance, etc. The results were expressed by the following 3-stage ranking system:

A: No changes were observed.
B: Some changes were observed, but they caused no problems upon application.
C: Practically unusable due to the conversion into a non-uniform emulsion as a result of separation into two layers or the formation of a precipitate.

As is apparent from the results of the performance evaluation in Table 1, the water-based compositions of Examples 1-5 were excellent in all the performance evaluation tests, such as barrier coat strength and removability, properties of coating films after the removal of the barrier coats, emulsion stability and dryability. Namely, they exhibited superb performance even under severe conditions.

In contrast, the compositions of Comparative Examples 1-4 in each of which the composition of the monomer mixture for the preparation of the component (a) was outside the corresponding range specified in the present invention, the composition of Comparative Example 5 in which the component (d) was not used and the composition of Comparative Example 6 in which the component (e) was not employed gave poor results in the performance evaluation test.

TABLE 1

| Water-based composition | | Example | | | | |
|---|---|---|---|---|---|---|
| | | 1 | 2 | 3 | 4 | 5 |
| Component (a) | Used monomer (X) Methacrylic acid | 10.0 | 10.0 | 10.0 | 10.0 | 12.0 |
| Water-based | Used monomer (Y) | | | | | |
| dispersion | Methyl methacrylate | 66.7 | 90.0 | 66.7 | 66.7 | 66.7 |
| (Amount of) | Ethyl methacrylate | 23.3 | — | 23.3 | — | 21.3 |
| monomer | Butyl methacrylate | — | — | — | 23.3 | — |
| mixture: 100 parts by weight) | Total amount of dispersion (a) | 667 | 667 | 667 | 667 | 667 |
| Component (b) | Ultraviolet absorber | 0.67 | 0.67 | 0.67 | 0.67 | 0.67 |
| Component (c) | Antioxidant | 0.67 | 0.67 | 0.67 | 0.67 | 0.67 |
| Component (d) Thickening agent/water-based dispersion (a), % | Acrylic thickening agent | 0.8 | 0.8 | 0.8 | 0.8 | 0.8 |
| Component (e) Active agent/water-based dispersion (a), % | Fluorocarbon-type surface active agent | 0.1 | 0.1 | 0.1 | 0.1 | 0.1 |
| High-pressure homogenization treatment | | Applied | Applied | Applied | Applied | Applied |
| Number average molecular weight of the particles (Mn) | | 7,000 | 7,500 | 12,000 | 10,500 | 11,000 |
| Glass transition point of the particles (Tg, °C.) | | 10 | 10.5 | 11 | 12 | 10 |
| (1) Appearance of barrier coat | | Clear Smooth | Clear Smooth | Clear Smooth | Clear Smooth | Clear Smooth |
| (2) Heat resistance test | | A | A | A | A | B |
| (3) Accelerated weatherability test | State of coating film | B | A | A | A | B |
| | Removability | C | B | A | A | B |
| (4) Protection test | Iron powder | A | A | A | A | B |
| | Soot resistance | B | B | B | B | B |
| | Sulfuric acid resistance | B | B | B | B | B |
| (5) Outdoor | State of barrier coat | A | A | A | A | C |

TABLE 1-continued

|  |  | Comparative Example | | | | | |
|---|---|---|---|---|---|---|---|
|  | | | | | | | |
| weatherability test | State of coating film | B | A | A | A | B | |
|  | Removability | C | B | A | A | C | |
| (6) Dryability test | | A | A | A | A | A | |
| (7) Emulsion stability test | | A | A | A | A | A | |

|  | Water-based composition | Comparative Example | | | | | |
|---|---|---|---|---|---|---|---|
|  |  | 1 | 2 | 3 | 4 | 5 | 6 |
| Component (a) | Used monomer (X) Methacrylic acid | 4.7 | 15.3 | 20.0 | 33.3 | 10.0 | 10.0 |
| Water-based dispersion | Used monomer (Y) | | | | | | |
|  | Methyl methacrylate | 66.7 | 66.7 | 66.7 | 53.3 | 66.6 | 66.7 |
| (Amount of) | Ethyl methacrylate | 28.6 | 18.0 | — | 13.4 | 23.3 | 23.3 |
| monomer | Butyl methacrylate | — | — | 13.3 | — | — | — |
| mixture: 100 parts by weight) | Total amount of dispersion (a) | 667 | 667 | 667 | 667 | 667 | 667 |
| Component (b) | Ultraviolet absorber | 0.67 | 0.67 | 0.67 | 0.67 | 0.67 | 0.67 |
| Component (c) | Antioxidant | 0.67 | 0.67 | 0.67 | 0.67 | 0.67 | 0.67 |
| Component (d) | Acrylic thickening agent | 0.8 | 0.8 | 0.8 | 0.8 | 0. | 0.8 |
| Thickening agent/water-based dispersion (a), % | | | | | | | |
| Component (e) | Fluorocarbon-type surface active agent | 0.1 | 0.1 | 0.1 | 0.1 | 0.1 | 0 |
| Active agent/water-based dispersion (a), % | | | | | | | |
| High-pressure homogenization treatment | | Applied | Applied | Applied | Applied | Applied | Applied |
| Number average molecular weight of the particles (Mn) | | | | | | | |
| Glass transition point of the particles (Tg, °C.) | | | | | | | |
| (1) Appearance of barrier coat | | Clear Smooth | Clear Smooth | Clear Smooth | Ultra-thin | Uneven | Uneven |
| (2) Heat resistance test | | A | C | C | B | C . | C |
| (3) Accelerated weatherability test | State of coating film | D | C | D | D | D | D |
|  | Removability | D | C | D | D | D | D |
| (4) Protection test | Iron powder | B | D | D | D | D | D |
|  | Soot resistance | B | C | C | C | C | C |
|  | Sulfuric acid resistance | B | C | C | C | C | C |
| (5) Outdoor weatherability test | State of barrier coat | B | D | D | C | D | D |
|  | State of coating film | D | D | D | C | D | D |
|  | Removability | D | D | D | C | D | D |
| (6) Dryability test | | A | C | C | B | C | B |
| (7) Emulsion stability test | | A | A | B | C | B | C |

What is claimed is:

1. A water-based protective composition for coating films, comprising:
   (a) a water-based dispersion of copolymer particles having a number average molecular weight of from 2,000 to 20,000 and a glass transition point of from −10° C. to +40° C. and obtained by emulsion-polymerizing 100 parts by weight of a monomer mixture consisting substantially of (X) 7-12 parts by weight of an α,β-monoethylenically-unsaturated carboxylic acid and (Y) 88-93 parts by weight of at least one ester selected from the group consisting of $C_{1-4}$-alkyl acrylates and $C_{1-4}$-alkyl methacrylates;
   (b) 0.1-5 parts by weight of an ultraviolet absorber, per 100 parts by weight of the monomer mixture employed for the preparation of the water-based dispersion (a);
   (c) 0.1-5 parts by weight of an antioxidant, per 100 parts by weight of the monomer mixture employed for the preparation of the water-based dispersion (a);
   (d) 0.1-2 parts by weight of at least one compound selected from the group consisting of acrylic thickening agents and natural gums, per 100 parts by weight of the total amount of the water-based dispersion (a); and
   (e) 0.01-6 parts by weight of at least one surface active agent selected from fluorocarbon-type surface active agents and acetylenic nonionic surface active agents, per 100 parts by weight of the total amount of the water-based dispersion (a).

2. The composition of claim 1, wherein the α,β-monoethylenically-unsaturated carboxylic acid (X) is at least one carboxylic acid selected from the group consisting of acrylic acid, methacrylic acid, crotonic acid, itaconic acid, maleic acid, fumaric acid, citraconic acid and mesaconic acid.

3. The composition of claim 1, wherein the ester (Y) is at least one ester selected from the group consisting of methyl acrylate, ethyl acrylate, n-propyl acrylate, iso-propyl acrylate, n-butyl acrylate, iso-butyl acrylate, sec-butyl acrylate, tert-butyl acrylate, methyl methacrylate, ethyl methacrylate, n-propyl methacrylate, iso-propyl methacrylate, n-butyl methacrylate, iso-butyl methacrylate, sec-butyl methacrylate and tert-butyl methacrylate.

4. The composition of claim 1, wherein the water-based dispersion (a) contains water in an amount 1.5-10 times by weight the monomer mixture.

5. The composition of claim 1, wherein the average particle size of the copolymer particles in the water-based dispersion (a) is 0.1-5.0 μm.

6. The composition of claim 1, wherein the ultraviolet absorber (b) is at least one compound selected from the group consisting of salicylate esters, benzophenones, benzotriazoles, substituted acrylonitriles and octyl phenolate-nickel complexes.

7. The composition of claim 1, wherein the antioxidant (c) is at least one compound selected from the group consisting of monophenolic antioxidants, bisphenolic antioxidants, high-molecular phenolic antioxidants and sulfur-containing antioxidants.

8. The composition of claim 1, wherein the component (d) is at least one compound selected from the group consisting of polyacrylic acids, alkali-neutralized products of polyacrylic acids, xanthan gum, guar gum and locust beam gum.

9. The composition of claim 1, wherein the surface active agent (e) is at least one compound selected from the group consisting of hydrophilic-group-containing oligomers having perfluoroalkyl groups and hydrophobic-group-containing oligomers having perfluoroalkyl groups; lower fatty acid salts of perfluoroalkylsulfonamides, ethylene oxide adducts, and alkyl betaine adducts; and volatile acetylenic alcohols, non-volatile acetylenic glycols and ethylene oxide adducts thereof.

* * * * *